A. BAUDRY.
PROCESS OF PURIFYING AND STERILIZING WATER.
APPLICATION FILED OCT. 3, 1904.

958,848.

Patented May 24, 1910.

Witnesses.
H. V. Brown
Walter N. Harris

Inventor:
Albert Baudry.
By H. A. de Vri
Attorney.

UNITED STATES PATENT OFFICE.

ALBERT BAUDRY, OF KIEF, RUSSIA.

PROCESS OF PURIFYING AND STERILIZING WATER.

958,848. Specification of Letters Patent. Patented May 24, 1910.

Application filed October 3, 1904. Serial No. 226,930.

*To all whom it may concern:*

Be it known that I, ALBERT BAUDRY, a citizen of the French Republic, residing at Kief, Russia, have invented certain new and useful Improvements in Processes of Purifying and Sterilizing Water, of which the following is a specification.

The object of this invention is to provide a new and improved continuous process for heating, softening, purifying and sterilizing water, etc.

Figure 1:
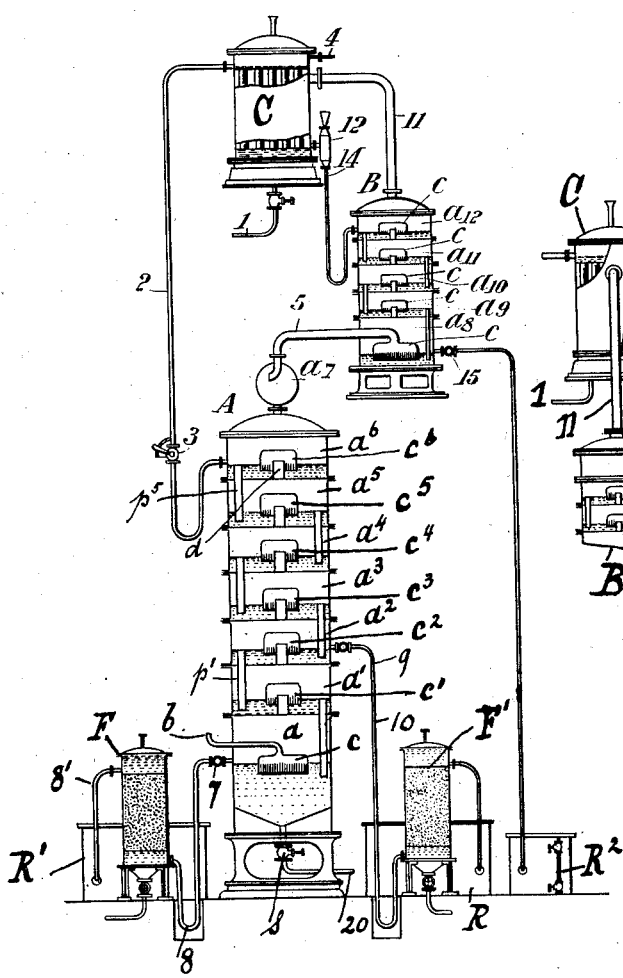
Figure 2:
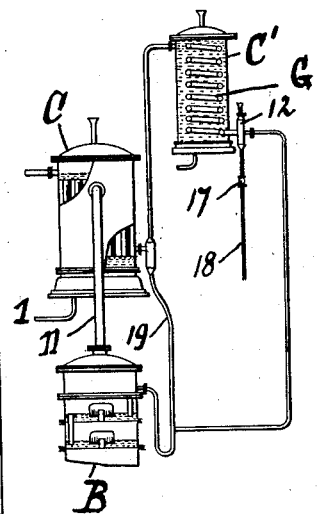

The invention is fully shown in the annexed drawing making a part of this specification and in which:

Figure 1, is a diagrammatic view, largely in central vertical section, of my improved apparatus designed for carrying said improved process into effect, and Fig. 2 is a like view of a small part of the upper portion of a slightly modified form of apparatus.

Referring to the drawing: The apparatus shown in the drawings comprises a main still or heating drum A, a preheater or drum C, an intermediate heater or drum B, and a filter drum or drums F and F', and in the modified form of apparatus shown in Fig. 2, a cooling or refrigerating coil G connected with the drums B and C.

The apparatus shown in Fig. 1 will work in the following manner: The cold water which is to be softened or to be sterilized, enters through the pipe 1 at the bottom of the condenser C, rises inside the tubes and condenses nearly all of the vapors entering through the pipe 11 into the condenser B. The water entering by the pipe 1, thus heated, leaves the condenser at the top of the latter and flows through the pipe 2 and the cock 3 into the upper chamber $a^6$ of the column A. The excess of hot water which the cock 3 has prevented from entering the column A, flows off through the overflow 4 out of the condenser C.

In the chamber $a^6$ are one or more caps $C^6$ covering the upper end of a pipe $d$ in communication with the chamber $a^5$ below, for forcing the vapors furnished by the ebullition of the water in the chamber $a^5$ to divide themselves as well as possible in the hot water arriving through the cock 3 and to condense there. The latent heat of the vapors condensing in the water of the chamber $a^6$, will cause the latter to boil, and this water will in turn furnish, a volume of vapors nearly equal to that which it has condensed, and these new vapors will be used for the production of distilled water as it will be presently pointed out. The boiling water of the chamber $a^6$ then descends through an overflow pipe $p^5$, into the chamber $a^5$ where it will be in contact with the vapors arriving from the chamber $a^4$ through the cap $c^5$, the lower end of the pipe $p^5$ being sealed by the water in $a^5$, as shown. The water which it is intended to soften or to sterilize, will be caused to boil a second time and the vapors which it will furnish will be condensed as already stated in the hot water entering (by the cock 3) the upper chamber $a^6$ of the column A. The same process will be repeated during the methodic descending motion of the water into the other chambers $a^4 - a^3 - a^2$. The heat necessary for the successive ebullitions of the water in the different chambers of the column A, being furnished by steam arriving through the pipe $b$ and distributed by the cap $c$, in the water of the last chamber $a$, wherein the vapor will be condensed leaving there the oil or other impurities which it contains. It results therefrom that the water of the chamber $a$, although perfectly softened could not be employed without damage for feeding steam generators and still less for the necessities of industries requiring as pure water as possible. This fact also elucidates why the different well known processes for softening water by means of the steam leaving steam engines have not given the desired results, and the present invention has for its object to remedy this defect. The employed means consists in drawing off the softened and boiled water directly from the chamber $a^2$, for experience has proved that this water has already been perfectly softened, and that it contains neither oil nor other impurities carried over mechanically by the steam coming from the cylinders of the steam engines which can be explained by the fact that the vapors causing the ebullition of the water of the chamber $a^2$ are furnished by the ebullition of the water in the chamber $a'$ and not by the steam of the engines arriving through the pipe $b$ and which the cap $c$ causes to condense in the water of the last chamber $a$ where the said vapor, as already stated yields up the oil and other impurities which it had mechanically carried with it. The practical consequence will be that the low tension vapor steam leaving the cylinders of the steam engines and which is without any use in many workshops, will be able to be used with a view of furnishing without any expense, softened and boiling water for the steam generators and for all the industrial uses necessitating pure water, ducing softened and sterilized water for and also, in certain special cases, for producing and other purposes.

As shown in Fig. 1 the softened water is drawn in a boiling state from the chamber $a^2$ by means of the pipe 9 and flows through the pipe 10 into a reservoir R after having passed or not through a small mechanical filter F'. The opening of the pipe 9 is regulated in such a manner that a small part of the water of the chamber $a^2$ descends through the overflow $p'$ into the chamber $a'$. As to the water oiled by the impurities carried on by the steam, it may be stated, that it flows off in a continuous manner from the lower chamber $a$ through the cock 7 and the pipe 8, by way of filter F, and pipe 8', into a reservoir R', while the sediment in the chamber $a$, is drawn off from the bottom by a pipe 20 having a stop-cock $s$, from time to time as occasion may require.

As it has been above stated the vapors produced by the ebullition of the water to be softened, in the upper chamber $a^6$ of the column A, instead of being lost by escaping into the atmosphere, are utilized for producing distilled water, perfectly freed from all impurities the boiling points whereof are lower than that of the water itself and which may be existing before in the boiling water in the different chambers of the column A as well as in the return steam arriving through the pipe $b$ at the bottom of the column A. To this end the vapors leaving the chamber $a^6$ first cross a chamber $a^7$ where they yield the particles of water which they might have carried away mechanically, then they flow through the pipes 5 and 11 into the condenser C, where they will be nearly completely condensed by the cold water which is to be softened or to be sterilized and which enters in determined proportions through the pipe 1, and circulates in the pipes of the condenser C. The water resulting from the condensation of these vapors, represents distilled water, the quality whereof is equal to that furnished by the apparatuses actually employed to this effect, that is to say distilled water containing about the same volatile impurities which were existing in the vapors entering the condenser. But when it is desired to obtain in large quantities distilled water practically absolutely pure, and this is one of the objects of the present invention, the following process is made use of:

Interposed between the condenser C and the drum A (which in this case can be considered as acting simply as a vaporizer) is a small drum B substantially similar in construction to A, formed by a certain number of chambers $a^{12}$—$a^{11}$—$a^{10}$—$a^9$—$a^8$. Instead of collecting the water which has been condensed in C, directly as distilled water, it is sent through the pipe 14 into the upper chamber $a^{12}$ whence it will successively descend into the other chambers of the small column B. A part of the vapors going from the vaporizer A to the condenser C, is then condensed in the small column B yielding their latent heat to the water coming from the condenser C, and the said latent heat will then cause the water to boil. Consequently, the condensed and hot water coming from the condenser C will undergo in the different chambers $a^{12}$ to $a^8$ a series of methodic ebullitions which will force all the elements the boiling points whereof are lower than that of the water, to pass from the liquid state into the state of vapor and to return in this state into the condenser C. It may be stated besides this that the impurities which are more volatile than the water and contained in the vapors flowing from the vaporizer A to the condenser C and traversing the column B, will not be able to condense in the water descending successively in the different chambers of the small column B as this water has a temperature which at least is equal to 100° C., and consequently they will not be able to soil this water again. As a matter of fact, this water coming from the condenser C and after having boiled successively in the different chambers of the small column B, will then be perfectly purified and freed from all the impurities more volatile than the water itself, and will then constitute really pure distilled water. This distilled water leaves the small column B at the bottom through the pipe 15 and then flows into the reservoir $R^2$.

As to the elements which are more volatile than the water itself and are eliminated in the above described manner in the form of vapors, they will flow into the condenser C through the pipe 11 and in order to prevent these elements accumulating in the condenser C, the following process is made use of: The amount of cold water entering through the pipe 1 at the bottom of the condenser C is regulated in such a manner that not the whole amount of vapors arriving through the pipe 11 from the small column B are condensed, but that a very small amount of vapors constantly escapes through the air and gas escape bottle 12 and this small amount of vapors carries with it the elements which are more volatile than the water, this being done in proportion they enter the condenser C. Experience has proved that it is sufficient for this when the amount of vapors leaving through 12 represents from 2 to 4 per cent. of the amount of vapors entering the condenser C. It results therefrom that these 2 to 4 per cent. of vapors (escaping through 12) contain from 25 to 50 times more of these elements more volatile than the water than there were existing in the vapors coming from the vaporizer A. In this manner these elements (the points of ebullition whereof are lower than that of the point of ebullition of water) are eliminated in a very concentrated state. When in certain particular cases these elements have themselves a certain value, then, instead of allowing them to be lost by escaping into the atmosphere through the air escape bottle 12, it will be preferable to condense them definitely in a refrigerator C' (as indicated in Fig. 2) which is also provided with an escape bottle 12' but through which only air and the non-condensable gases will escape at the temperature existing in C'. A cock 17 allows from 2 to 4 per cent. of the amount of liquid condensed in C' to escape through the pipe 18, and this liquid will contain 25 to 50 times more of these elements which are more volatile than the water itself, than there were existing in the vapors coming from the vaporizer A. As to the excess of liquid condensed in C' which could not escape through the cock 17, it will automatically return through the pipe 19 into the upper chamber $a^{12}$ of the small column B, at the same time with the liquid condensed in the condenser C. The elements which are more volatile than the water itself and which are inclosed in the liquid coming from C will be converted into vapors in the column B, and will thus be again expelled in the condenser C and from the latter into the refrigerator C'.

This process is a general one and can be employed each time when it is necessary to separate from a liquid of any kind, an element or a group of elements the points of ebullition whereof are lower than that of the liquid wherein these elements are either in the state of dissolution or in the state of a simple mixture.

Having now fully described my said invention what I claim and desire to secure by Letters Patent is:

1. The hereinbefore described process of purifying water which consists in heating the water, passing the vapors of the same through a cooler body of water so as to condense a portion of the vapor, causing the products of condensation to flow by gravity through a plurality of condensing chambers each containing a body of the condensed liquid, bringing each of the bodies of products of condensation into ebullition by causing vapor from the lower chambers to pass through the water and drawing off the principal purified water from an intermediate chamber.

2. The hereinbefore described process of purifying water which consists in heating the water, passing the vapors of the same through a cooler body of the same liquid so as to condense a portion of the vapor, causing the products of condensation to flow by gravity through a plurality of condensing chambers each containing a body of the condensed water, bringing each of the bodies of products of condensation into ebullition by causing vapor from the lower chambers to pass through the water, passing the same into a reservoir by way of a filter, and drawing off the principal water from an intermediate chamber.

3. The hereinbefore described process of purifying water which consists in causing the heated liquid to vaporize, and the products of condensation to flow by gravity through a plurality of chambers in each of which the products of condensation are kept in ebullition by the passage through the same of vapors from the heated water.

4. The hereinbefore described process of purifying water which consists in causing the heated liquid to vaporize, and the products of condensation to flow by gravity through a plurality of chambers in each of which the products of condensation are kept in ebullition by the passage through the same of vapors from the heated water, the vapors last to pass through the water being only those from water which has itself been condensed within the apparatus.

5. The hereinbefore described process of purifying water which consists in vaporizing and condensing and revaporizing, and re-condensing the water in a plurality of chambers, the vaporizing in the last condensing chambers being brought about by bringing the vapor from the condensed water in one chamber into direct contact with the water in the next preceding chamber for the purpose of vaporizing the same.

6. The hereinbefore described process of purifying water which consists in vaporizing and condensing and re-vaporizing and re-condensing the water in a plurality of chambers, the vaporizing in the last condensing chambers being brought about by bringing the vapor from the condensed water in one chamber into direct contact with the water in the next preceding chamber for the purpose of vaporizing the same, and separating the more volatile portions of the water from the main body of water.

7. The hereinbefore described process of purifying water which consists in vaporizing and condensing and re-vaporizing and re-condensing the liquids in a plurality of chambers, the vaporizing in the last condensing chambers being brought about by bringing the vapor from the condensed water in one chamber into direct contact with the water in the next preceding chamber for the purpose of vaporizing the same, and separating the more volatile portions of the water from the main body of water by refrigerating the water to a point sufficient to condense the least volatile constituents of the water to be purified.

8. The hereinbefore described process of purifying, sterilizing and softening water which consists in slightly heating the same in a preheater, through which the water passes upward, admitting steam to the top of the preheater, drawing off the feed water and condensed water of the steam from the top of the preheater, reheating the same in an intermediate heater in which the overflow of the water from the preheater is comminuted, causing the steam from a main still to pass upward into the preheater through the falling mass of comminuted water, and condensing the water thus purified.

ALBERT BAUDRY.

In presence of—
 THOS. E. HEENAN,
 THOMAS MILES.